INVENTOR.
FRANK ANTON WEBER

INVENTOR.
FRANK ANTON WEBER

United States Patent Office 2,792,745
Patented May 21, 1957

2,792,745

CAMERA FOR TAKING STEREOSCOPIC IMAGES WITHOUT ABNORMAL STEREOSCOPIC EFFECT

Frank Anton Weber, The Hague, Netherlands

Application January 7, 1952, Serial No. 265,258

Claims priority, application Netherlands January 12, 1951

3 Claims. (Cl. 88—16.6)

The invention relates to cameras for taking stereoscopic film, photographic and television images which show no abnormal stereoscopic effect on projection.

It is known to make the stereo-base dependent on the distance between objective and object and the focal distance of the objective. To this end various shooting formulae have been developed. Still other stereo-shooting formulae take the depth of the object and/or the increase on projecting, into consideration.

It has been agreed upon that for recording so-called close-ups and semi-close-ups the stereobases have to be very small.

However, it is impossible to manufacture objectives of good quality and light intensity and allowing such small stereobases, when two parallel or substantially parallel disposed and synchronized cameras for left and right exposure resp. are applied, whilst this is not or not sufficiently possible with cameras disposed in a different way with respect to each other. Apart from this the two-camera-system has drawbacks of practical nature.

It has appeared that in view of the ease of manipulation, mutual fixation of the partial images, shrinkage, possibility of copying with film and photo, and economy, that stereo-exposure has to be done by means of one camera. In so doing the requirement is to be made that irrespective of the diameter of the objective and irrespective of the fact whether photo, film or television-images of various sizes are concerned, it will have to be possible to apply small stereobases.

It has already been proposed to use merely one objective, in front of which a system of mirrors or prisms is disposed, but besides this practical drawback such as the great size of the mirrors owing to the divergence, this has the disadvantage that apart from great stereo-bases no small stereo-bases are possible. Besides the simultaneous exposure of both partial images via one objective gives rise to deformations and to boundary-disturbances on the contact line of the two partial images. The size of these partial images is too small for obtaining a sufficiently light-intensive projection, especially all stereo-projection-systems give about 50 to 60% loss of light with respect to the two-dimensional projection. Therefore it is very desirable that the partial images, also if they are taken via one objective, are each still recorded in the size, which is standardized for two-dimensional film, photo or television, which implies that the recording of left and right image in general cannot take place simultaneously. If two partial images will have to be taken simultaneously the objective should be a composite or partial objective. Already a composite objective has been applied in which the partial objectives lie adjacent to each other and in which e. g. with film, however, by the standardized width of the band, no sufficiently great part-images can be obtained.

Summarizing it has been established, that the requirements for stereoscopic pictures avoiding an abnormal stereoscopic effect, are:

(a) In the close-up and semi-close-up region, very small stereo-base;

(b) Taking a picture with one camera;

(c) When using one objective, alternate exposure of the partial images;

(d) On simultaneously recording the partial images, application of an objective consisting of two congruent partial objectives, preferably each giving a partial image of full-size, the objectives being superposed;

(e) Equally intensive exposure of left and right partial image;

(f) Transition of very small to large base or the reverse is possible during shooting.

The aim of the invention is to enable—with sufficiently large partial images—the recording with one camera with large as well as with very small stereo-base, adjustable during the shooting.

According to the invention this is attained by placing in front of the objective two mirrors about parallel to each other, the objective, picture gate and/or front system of mirrors or prisms being so arranged that also very small stereo-bases may be applied, as necessary for avoiding an abnormal stereoscopic effect, also if each of the partial images has the size usual with two-dimensional images.

One of the embodiments according to the invention is a camera in which a single objective is applied in front of which a system of mirrors is placed consisting of two mirrors turned towards the objective, one of which covers the objective alternately and synchronically with the image shifting mechanism or releases it, the other mirror being so displaceable that any stereo-base, necessary for obtaining no abnormal stereoscopic effect, may be used.

According to the invention it is possible as well to so make the camera that the objective consists of two superposed partial objectives and the picture-gate has such a dimension that two superposed partial images, each of the size usual with two-dimensional images are taken simultaneously via a mirror-system consisting of two displaceable mirrors turned towards the objective and substantially parallel to each other, the one of which is placed in front of the one partial objective and the other in front of the other partial objective, in such a way that any stereo-base, required for attaining no abnormal stereoscopic effect can be applied, but this has the drawback of deformation of the partial images.

Also according to the invention it is possible that the mirror which is arranged most close to the objective is made as lattice of alternating reflecting and transparent lines or bands, so that both partial images are recorded alternately arranged in one size common with two-dimensional exposures.

A few embodiments of the invention are shown in the drawing and a few other characteristic features of the invention will be described.

Figure 1:
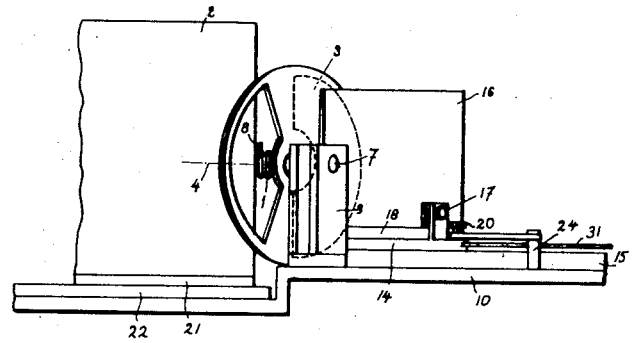
Fig. 1 is a diagrammatic side view of a camera according to the invention, with rotating mirror.
Figure 2:
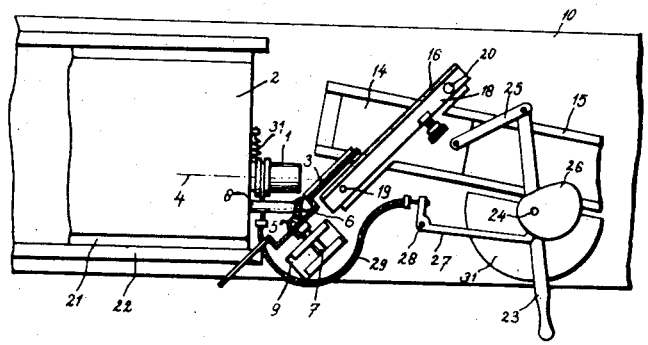
Fig. 2 is a diagrammatic plan view.

With reference to Figs. 1 and 2 a rotating mirror 3 is arranged in front of the singular objective of the camera 2. This mirror makes an angle of 45° with the optical axis 4. The mirror intermittently covers the objective and can be driven by means of for instance tooth wheels 5, 6, in synchronism with the image shifting mechanism of the camera. The mirror is mounted on a rotatable shaft 7, which is supported without vibration in the support 9. The support 9 is stationarily mounted on the base plate 10, which also carries the camera. The base plate 10 can be fastened to a stand, not shown. It is evident that instead of the rotating mirror 3 also a reciprocating or oscillating mirror can be used which alternately covers the objective and releases it. Parallel or substantially parallel to the rotating mirror 3 a second mirror 16 is mounted on a slide 14, said mirror being slidable to and fro in a guide, 15. When the rotating mirror 3 does not cover the objective 1, the optical axis meets the slidable mirror 16, so that the exposure takes place via this mirror. The distance between the points where the optical axis 4 meets the rotating mirror 3 resp. the slidable mirror 16 is the stereo-base. Therefore according to the thickness of the mirror 3 the stereo-base will be as small as possible. In practice a stereo-base of 7 mm. is small enough. The slide 14 can be displaced e. g. by means of a lever 23, a scale 31 being provided at a suitable place. The scale can be gauged according to the usual shooting-formulae.

It is recommended to make the scale movable, to which the adjustment of the stereo-angle can be coupled for automatic adjustment, e. g. in dependence of the focal distance of the objective. Stereo-angle-adjustment may also be coupled to the shifting mechanism of the objectives.

By means of an adjusting knob 17 the displaceable mirror 16 can be rotated about a pivot 19 with respect to the slide 14, so that the stereo-angle e. g. the angle between the optical axis passing through the two mirrors towards the object can be adjusted at any desired value. The mirror 16, which is pivotally mounted on a base plate 18 on the pivot 19, can be fastened in the desired position by means of a screw 20. In order to enable the interchange of objectives, the camera is mounted on a slide 21, which runs in a guide 22 mounted on the base-plate 18. However, it is also possible to displace the entire mirror-system with respect to the camera. The adjustment of the stereo-base can serve as well to control the sharpness-adjustment of the objective 1.

To this end a disc 26 is connected on the lever 23, which turns about the point 24, against which disc a lever 27 which is pivotable about point 28 presses, the lever 27 being connected with a Bowden-cable 29. This Bowden-cable runs to the adjusting mechanism 30 of the objective. The spring 31 always keeps the mechanism in an extreme position. The exchangeable disc 26 is so mounted that the displacement of the adjusting mechanism for the sharpness corresponds to a definite shooting distance. It is evident that the sharpness-adjustment may also be controlled by hand.

Since every eye must receive a sufficient number of impressions per second, so as to perceive the subsequent images as one fluent motion, the velocity of working will have to be adapted to same, so that with this arrangement mostly 32 to 48 images (16-24 partial images of every kind) per second will be recorded. Owing to this the time-parallax is reduced to such small proportions that it is hardly perceivable any more.

Figure 3:
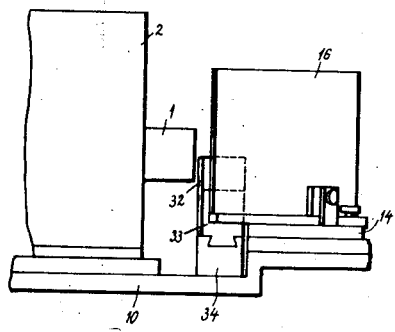
Fig. 3 is a diagrammatic side view of a camera with stationary mirrors.
Figure 4:
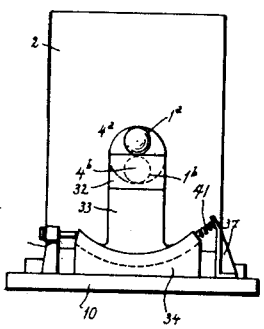
Fig. 4 is a diagrammatic front view of same, a mirror being omitted.
Figure 5:
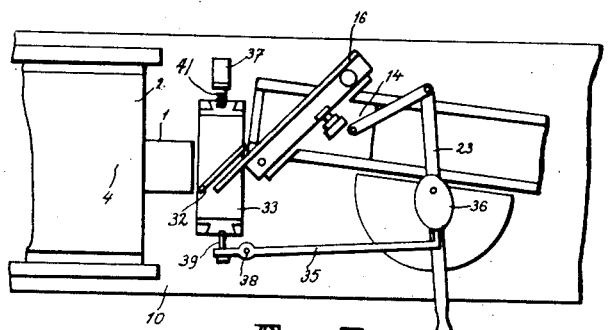
Fig. 5 is a diagrammatic plan view of the camera.

However, according to the embodiment shown in Figs. 3, 4 and 5 it is possible to entirely remove the time-parallax. The camera is provided with a double objective and a mirror-system for simultaneously recording both partial images. In front of the double-objective 1, consisting of superposed part-objectives 1a and 1b, two mirrors are placed, viz the slidable mirror 16 on the slide 14, as described above, serving for the part-objective 1a. In front of the part-objective 1b a mirror 32 is arranged. The latter extends exactly unto the contact-line of the two part-objectives. The latter is fixed to a bearing 33, which can pivot with a slide-like base over a small angle in the socket 34 about the optical axis 4b of the part-objective in a plane perpendicular to this optical axis, so as to correct the vertical parallax. By means of a lever 35, pivotable about 38, via an interchangeable disc 36, the correction of the vertical parallax can be adjusted automatically with the shooting-distance. Spring 41 on support 37 serves for removal of the play between lever 35 and disc 36. By means of screw 39 corrections can be made.

The small-height-parallax occurring with this embodiment besides can be reduced, e. g. with a film by making the height of each part-image smaller, owing to which the interaxial distance of the two-part-objectives becomes less. A part-image, thus reduced in height-dimension is not only better adapted to the sight-range of the eyes, but also a considerable saving in exposure and reproduction material is obtained, which is of special importance with the expensive colour film. Naturally this also applies for two-dimensional films. When projecting the light-intensity remains practically as high as with stereo-projection of two full images, so that the reduction of the height of the part-images is of importance with the other embodiments as well. With 35 mm. film e. g. the height of the part-images can be so chosen that per two part-images only a film length corresponding to six perforations is required instead of eight perforations otherwise required.

The height parallax is then reduced by more than 23%, whilst a saving of 25% of the film material is obtained.

Figure 6:
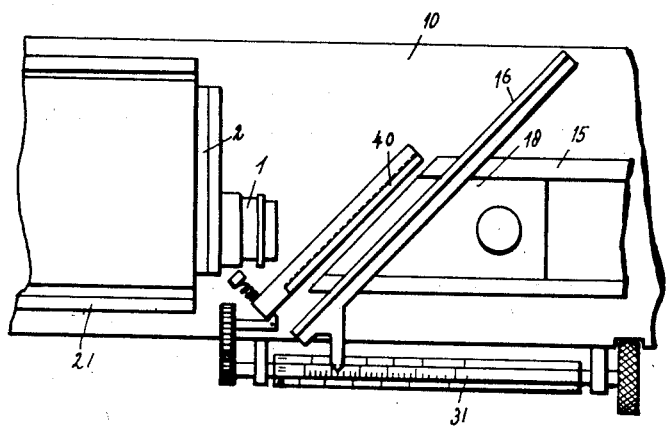
Fig. 6 is a diagrammatic plan view of a camera in a third embodiment.

However, it is also possible to avoid the height-parallax entirely. In Fig. 6 an embodiment is shown, in which a singular objective is used and the mirror 32 is replaced by a mirror 40 covering the whole angle of the objective. This mirror is made as a grid of vertical or horizontal, alternately reflecting and transparant lines or bands of e. g. 50 per mm. i. e. 25 reflecting and 25 transparent lines. Behind this mirror, reckoned from the objective, the mirror 16 is arranged. The one part-image reaches the objective via the reflecting lines of mirror 40; the other part-image reaches the mirror 16 via the transparent lines of mirror 40, and after reflection by mirror 16 it reaches the objective via the transparent lines of mirror 40. The total scene reaching the sensitive exposure plane consequently is interlined and therefore the two part-images coincide in same.

When this interlined image is projected, e. g. with polarized light, an interlined polafilter may be placed at a sufficient distance in front of the projection lens, said polafilter being uniform with the interlined image. When these bands are alternately polarized in directions making an angle of 90° with each other, the two part-images will each appear on the projection plane in light of a definite polarisation-direction. When projecting with a lattice-screen the polafilter in front of the projection lens is replaced by a ruled mirror, uniform with the mirror 40. The one image then hits the screen via the transmitting bands; the other one is cast on the screen via a second mirror, after having been reflected by the reflecting bands. Therefore with this embodiment there is no time- or height-parallax, whilst a camera can be used as normally employed for two-dimensional exposures. The embodiment besides has the advantage that in one single size usual for two-dimensional exposures, the two part-images are arranged, each covering the whole size, though ruled. The projection therefore can take place with a commonly used projection apparatus.

Finally it may be observed that with all embodiments it will be possible to place a third mirror either between the two mirrors and the objective, or between the two mirrors and the object, in order that the part-images come to lie not in the reflected image, but directly in the correct position in the sensitive exposure plane.

I claim:
1. In a stereoscope camera having a two part objective, a regulable mirror system arranged in front of the objective adapted to provide an adjustable stereo-base and stereo-angle during the photographing of stereoscopic images, said mirror system comprising two substantially parallel mirrors, one mounted on the optical axis of each of the parts of said two part objective, the optical axes of the parts of said two part objective lying in a plane perpendicular to a plane containing the lines of sight from an image to said mirrors, one of said mirrors lying closer to said objective than the other, the other of said mirrors having a flat reflecting surface and lying farther from said objective than said one mirror, and a slide on which said other mirror is pivotally mounted for pivotal movement about an axis perpendicular to the optical axis on which said other mirror is mounted, whereby said other mirror may be moved toward said one mirror to adjust the stereo-base to a size only slightly greater than the thickness of the reflecting surface of said one mirror.

2. A regulable mirror system as claimed in claim 1 in which said one mirror obscures said other mirror from one of the parts of said two part objective.

3. A regulable mirror system as claimed in claim 2 in which tilting means are provided in front of said objective and said one mirror is mounted on said tilting means for tilting, whereby said one mirror may be tilted in a plane perpendicular to the optical axis on which said one mirror is mounted for correction of parallax, pivoting means for pivoting said other mirror on said slide, means for moving said slide, and means connecting said means for moving said slide and said tilting means for tilting said one mirror when said other mirror is moved by said slide.

References Cited in the file of this patent

UNITED STATES PATENTS

| | | |
|---|---|---|
| 728,584 | Dickson | May 19, 1903 |
| 731,405 | Dickson | June 16, 1903 |
| 1,282,073 | Hahn | Oct. 22, 1918 |
| 1,714,849 | Daponte | May 28, 1929 |
| 2,413,996 | Ramsdell | Jan. 7, 1947 |
| 2,568,327 | Dudley | Sept. 18, 1951 |
| 2,595,409 | Reijnders | May 6, 1952 |

FOREIGN PATENTS

| | | |
|---|---|---|
| 5,267 | Great Britain | of 1906 |
| 511,070 | Germany | Oct. 25, 1930 |
| 575,911 | Great Britain | Mar. 11, 1946 |